United States Patent
Ginter (12)

(10) Patent No.: US 6,192,392 B1
(45) Date of Patent: Feb. 20, 2001

(54) UPDATING MECHANISM FOR USER PROGRAMS IN A COMPUTER SYSTEM

(75) Inventor: Thomas Ginter, München (DE)

(73) Assignee: Siemens Aktiengesellschaft, Munich (DE)

(*) Notice: Under 35 U.S.C. 154(b), the term of this patent shall be extended for 0 days.

(21) Appl. No.: 08/952,834

(22) PCT Filed: May 28, 1996

(86) PCT No.: PCT/EP96/02266

§ 371 Date: Nov. 24, 1997

§ 102(e) Date: Nov. 24, 1997

(87) PCT Pub. No.: WO96/38785

PCT Pub. Date: Dec. 5, 1996

(30) Foreign Application Priority Data

May 29, 1995 (DE) .............................. 951 08 193

(51) Int. Cl.[7] .................................... G06F 13/38
(52) U.S. Cl. .................. 709/203; 709/201; 709/202; 709/203; 709/101; 709/211; 707/1; 707/10
(58) Field of Search .................... 709/200, 101, 709/203, 211, 201, 202; 707/1, 10

(56) References Cited

U.S. PATENT DOCUMENTS 5,694,601 * 12/1997 White .................................. 709/101

OTHER PUBLICATIONS

USENIX Assoc., Summer Conference Proceedings, Atlanta Jun. 6, 1986, Daniel Nachbar, When Network File Systems Aren't Enough: Automatic Software Distribution Revisited, pp 159–171.*

IBM Technical Disclosure Bulletin, vol. 33, No. 3A, Aug., 1990, XP 000123899, Configuring File Servers From Hosts, p. 194.*

USENIX Association, Summer Conference Proceedings, Atlanta Jun. 9, 1986, Daniel Nachbar, When Network File Systems Aren't Enough: Automatic Software Distribution Revisited, pp. 159–171.

IBM Technical Disclosure Bulletin, vol. 33, No. 3A, Aug., 1990, XP 000123899, Configuring File Servers From Hosts, p. 194.

* cited by examiner

*Primary Examiner*—Dung C. Dinh
*Assistant Examiner*—Hien C. Le
(74) *Attorney, Agent, or Firm*—Schiff Hardin & Waite

(57) ABSTRACT

In multi-user operating systems, set-up files that are present locally have to be processed each time a user logs in at a computer, in order to undertake settings at the computer which optimally configure the further operating of the user using his user programs. If an update of a user program is now fed in, it is also necessary to change the associated set-up file. This change to a set-up file is now carried out on a net-wide basis and automatically on the basis of the set-up mechanism.

3 Claims, 1 Drawing Sheet

UPDATING MECHANISM FOR USER PROGRAMS IN A COMPUTER SYSTEM

BACKGROUND OF THE INVENTION

In multi-user operating systems, for example UNIX, HP-UX9.01, SUNOS, Domain-OS10.4, one or more files have to be processed each time a user logs in at a computer, in order to undertake settings at the computer and/or its operating system which optimally configure the way in which a user continues to operate with his user program or to optimally configure the utility of the user program.

Each user program therefore needs specific settings of the computer, which are specified in said files, for the purpose of optimal utilization.

At present, these specific settings are realized by the following mechanism:

In the personal set-up file in the computer of a user of the user program "Mentor" there is, for example, the following entry:
XX
source/setup/mentor/cshrc
XX The effect of the above entry is that, for example, the search path is extended, variables for license files are set, as are further environment variables which control the further behavior of the user program "Mentor".

The directory structure of "/setup" in a user computer corresponds approximately to the following illustration:

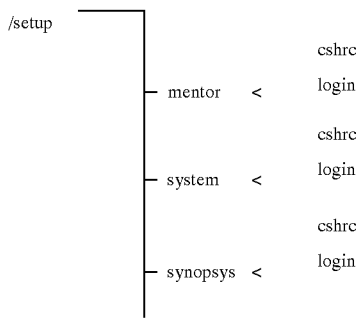

In the case of said set-up mechanism, all the set-up files must always be present locally on each user computer, in order to ensure reliable functioning and/or optimum setting of the user programs. If it is then necessary to perform changes to the set-up files (if for example an update of a user program is to be fed in and this update requires new settings or changed settings), then these changes must be performed on all the computers.

Carrying out these changes has hitherto been performed by calling up the set-up files and copying them by hand. However, this means that there is a considerable administrative effort, in particular in the case of large networks and many users or user programs.

SUMMARY OF THE INVENTION

The invention is based on the object of specifying a set-up mechanism which makes it possible to change the set-up procedure for user programs with immediate effect for all users of the network.

In general terms the present invention is a set-up mechanism for user programs in a computer network. A master computer updates set-up files specific to user programs on a net-wide basis, in that it copies the files onto Slave computers. User computers, in the home directory of a user, manage a local set-up file for each user program, which requests the net-wide standardized set-up file from the Slave computer, and activates it, each time a user logs in at a User computer. A User computer in a computer network has a multi-user operating system and a home directory. The home directory manages a local set-up file for each user program. The local set-up file requests a net-wide standardized set-up file for each user program from the Slave computer, and activates it, each time a user logs in at the User computer.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE depicts a computer network in which the present invention is utilized.

DESCRIPTION OF THE PREFERRED EMBODIMENTS

Figure 1:
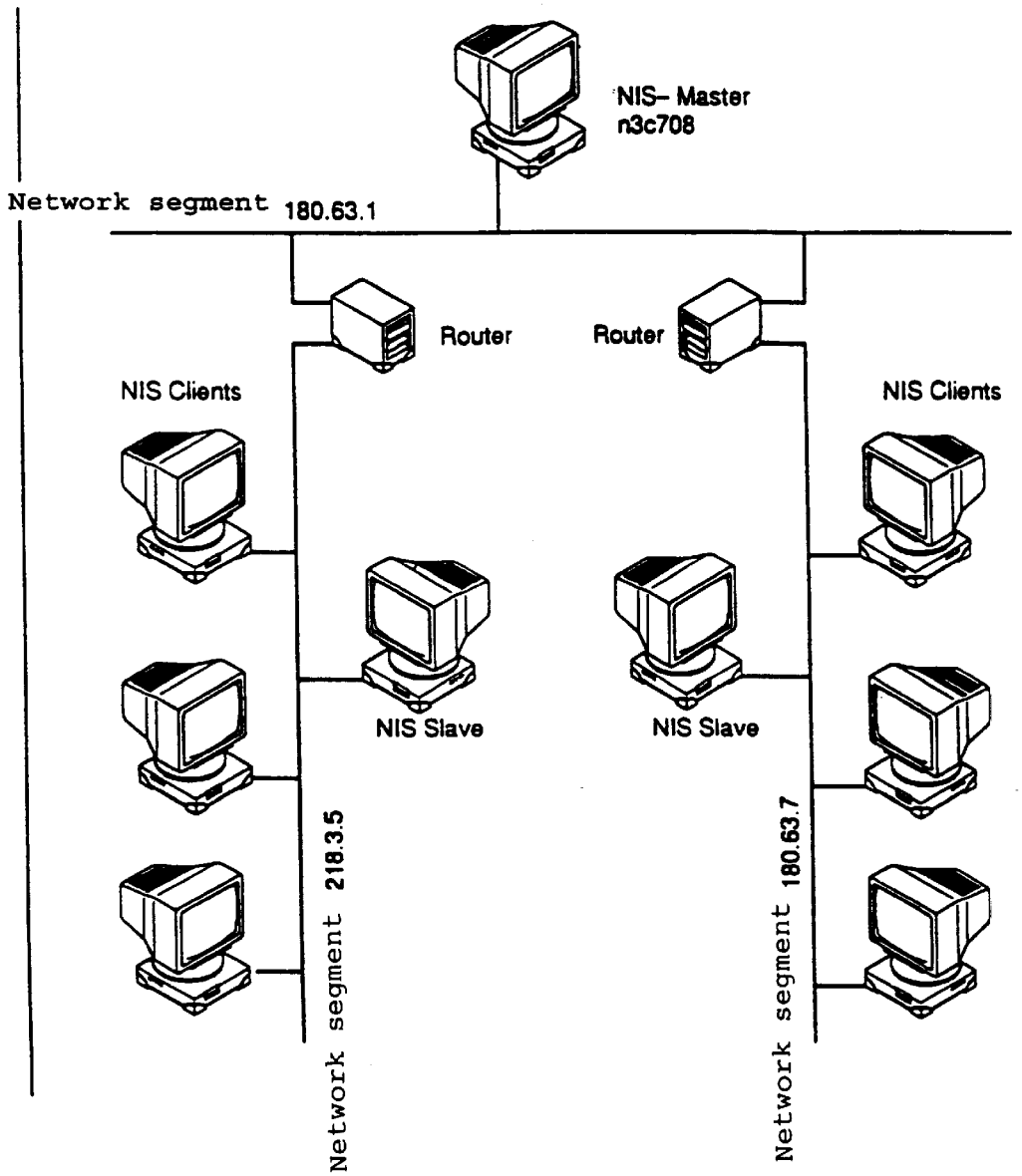

The single FIGURE shows a computer network having connected computers, which run in a heterogeneous operating system environment (SUN-OS; HP-UX; OSF1; Domain OS 10.4). In these operating systems, data that is important to the computers is administered by a so-called network information service, NIS for short. The NIS service subdivides the computers of the network into three categories, specifically an NIS Master, NIS Slave and NIS User computer.

The Master computer is the central computer, from which data that is important to the computers (for example password, group, autouser . . . ) can be distributed to the Slave computers. The data to be distributed can be changed only via the Master computer.

The Slave computer is, as already mentioned, updated with current data by the Master computer, and makes this data available to the User computers on request.

The User computers in each case ask for system-relevant data from a Slave computer. The Slave computer must in this case be present in the local network segment, since a request via gateways (designated as "Router" in the FIGURE) is not possible.

If, for various reasons (maintenance work or a crash) the Slave computer should fail, then access to the data distributed by the NIS service is no longer possible for all the User computers in the corresponding network segment. At the same time, however, operating on the User computers is therefore no longer possible. For this reason, each network segment is operated using at least two Slave computers, which mutually replace one another in the event of failure.

The set-up mechanism according to the invention operates according to the following principle:

The following directory structure is set up on all the Slave computers:
/usr/setup Each night, the directory structure, which is also designated as the Master directory below, is copied onto the Slave computers.

In order to make access to this Master directory possible for users, for example users of the user program "Mentor", the following entry must be appended in a personal set-up file of a user (contained in the home directory), for example the set-up file .cshrc:

XX
set NISNODE=ypwhich
source/host/$NISNODE/user/setup/mentor/cshrc
XX

The above entry in the set-up file of a user therefore leads to the activation of a system-wide standardized set-up file, which is in each case present in the Slave computers. The variable $NISNODE ensures that the set-up file .cshrc is always reached, irrespective of which Slave computer is currently active as the server. The set-up mechanism according to the invention ensures that settings that are technically important for a user program are maintained in a consistent manner for all users of the user program, to be specific irrespective of the computer and of the network structure. In order to equip a net-wide set-up file for a user program in the Master directory, each person in the system administration responsible for a user program can commission a sub-directory of the Master directory. This sub-directory is then allocated to the applicant with the following write/read rights:

drwxr-xr-x wht lib mentor

On the basis of the above allocation, only the person responsible for a user program is authorized to make changes in the sub-directory. The sub-directory can, however, be read by any user of the user program.

The personal set-up files .cshrc and .login in the home directory of a user are to be distinguished from the set-up files of the same name in the Master directory.

According to the set-up mechanism according to the invention, reference is now made, in the personal (user-specific) set-up files in the home directory, to the system-wide standardized set-up files in the Master directory, with the result that the user-specific set-up files, in addition to safety queries (for example in relation to the existence of called objects), now only on the one hand activate the system-wide standardized set-up files in the Master directory and, on the other hand, any other further user-specific set-up commands or files.

On the basis of the set-up mechanism according to the invention, all the users thus operate using the same net-wide standardized set-up files .login and .cshrc, which are continuously updated. The personal set-up files of the user therefore no longer require any kind of modifications, even if the net-wide set-up of one or more user programs is changed.

Templates for the two personal files of a user, which serve for the free personal configuration of the user, are located in the Master directory and are called user_login_template and user_cshrc_template. Personal additions to the set-up are undertaken by means of the files .my_own_login and, respectively, .my_own_cshrc in the home directory. These personal additions are activated automatically if they exist. A further file in the home directory, namely the file .tools, serves the purpose of selecting the set-ups for the user programs (tools) made available to a user. The file. tools contains, line by line, entries for all the desired user programs. The "System" setup required for the operating system is activated in every case, so that it does not need to be listed in the file .tools. The existence of .tools is thus optional.

The output of additional debug messages when running through the set-up is effected by starting a further file, the so-called stop file ".message", in the home directory by means of "touch".

In the following text, the Master directory and its distribution in the computer network will be explained once more in more detail.

The Master directory, that is to say the directory /user/setup, is the master for all the user programs/objects that are present in the computer network and for which a set-up mechanism is needed. For each user program (tool) that is supported by the set-up mechanism, it contains one sub-directory. A sub-directory in turn contains everything that is needed for the direct set-up of the respective user program. For example, the two files .login and .cshrc are needed for the user programs Mentor and Synopsis and, as already mentioned, are activated by the personal set-up file of a user after he has logged in to the system. The name of these set-up files and their storage location are fixed, whereas their content and their functionality is determined by the tool group. Necessary changes in the set-up for a specific tool (for example in the case of a change of version) must be undertaken by the tool group in the Master directory (/user/setup/<tool>), in order to make them available to all the users of this tool in the computer network. The Master directory is, as already mentioned, distributed to all the Slave computers on request or cyclically, once per day. These copies are accessed by the individual owners before they work with a user program. The person-related responsibility for the tool sub-directories is implicitly defined by their owner attributes and group attributes.

Located in the Master directory is the file used_vars. This file lists and describes all the fast variables which are used for setting up the individual tool groups. Each tool group must enter its variables there, in order that the uniqueness is ensured and no conflict can be produced by dual use. Of particular importance, are primarily, the three following variables from the "System" region:

message: is set by the file .cshrc started in the home directory, if test messages are intended to appear;
YP: indicates the responsible Slave computer;
Setup_DIR: points to the active set-up directory on the Slave computer.

In order to activate the set-up mechanism according to the invention, a user must complete the following steps in detail:

copying the template files from the Master directory to the corresponding points in his home directory, editing the file tools in the home directory, in order to activate the correct tool, possibly creating personal set-up files .myownlogin, .myowncshrc, . . .

testing whether everything is functioning (by means of touch message, a stub file is started in the home directory, which effects the output of additional debug messages when running through the set-up).

In order that the performance of the set-up routines is satisfactory, as many settings as possible should be carried out via the file .login (and not via the file .cshrc), since settings for the entire session at the computer are undertaken once in .login, whereas the file .cshrc is run through and interpreted each time a shell is opened.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A set-up mechanism for user programs in a computer network, comprising:

a) a Master computer, which updates set-up files specific to user programs on a net-wide basis, in that the Master computer copies said files onto Slave computers; and b) User computers having home directories containing local set-up, a respective local set-up file, which is present in the home directory of a respective user computer for each user program, being processed by the respective user computer in each log-in process, said respective local set-up file containing a call to a slave computer to request and activate a net-wide standardized set-up file.

2. A set-up system for user programs in a computer network, comprising:

a master computer and slave computers, that master computer updating, set-up files specific to user programs on a net-wide basis by copying the set-up files to the slave computers; and user computers which, in a home directory of a user, manage a local set-up file for each user program, which requests an appertaining net-wide standardized set-up file from the slave computer, and activates the standardized set-up file, each time a user logs onto a user computer.

3. A user computer in a computer network, comprising:

a home directory;

a local set-up file in the home directory, which is present for each user program, which the user computer processes each time a user of the user computer logs onto the computer network;

the local set-up file also having a call to a slave computer to request and activate a net-wide standardized set-up file in the computer network.

* * * * *